(12) United States Patent
Axelrod et al.

(10) Patent No.: US 12,256,714 B2
(45) Date of Patent: Mar. 25, 2025

(54) SEPARABLE CHEW TOY HAVING AN INTERNAL CAVITY ACCESSIBLE VIA A CLUTCH MECHANISM

(71) Applicant: T.F.H. PUBLICATIONS, INC., Neptune City, NJ (US)

(72) Inventors: Glen S. Axelrod, Colts Neck, NJ (US); Ajay Gajria, Monmouth Junction, NJ (US)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 255 days.

(21) Appl. No.: 18/166,421

(22) Filed: Feb. 8, 2023

(65) Prior Publication Data

US 2024/0260543 A1 Aug. 8, 2024

(51) Int. Cl.
*A01K 15/02* (2006.01)

(52) U.S. Cl.
CPC .................. *A01K 15/026* (2013.01)

(58) Field of Classification Search
CPC .................................................. A01K 15/026
USPC .................................................. 119/709–711
See application file for complete search history.

(56) References Cited

U.S. PATENT DOCUMENTS

| | | | | |
|---|---|---|---|---|
| 6,892,674 | B1 * | 5/2005 | Dubinins | G10K 5/00 119/702 |
| 8,464,665 | B1 * | 6/2013 | Scheffler | A01K 15/026 119/707 |
| 8,534,232 | B2 | 9/2013 | Axelrod et al. | |
| 8,640,647 | B2 * | 2/2014 | Dotterer | A01K 5/0114 119/51.01 |
| 8,935,992 | B2 | 1/2015 | Axelrod et al. | |
| 9,339,011 | B1 * | 5/2016 | Crabtree | A01K 15/026 |
| 9,629,338 | B2 * | 4/2017 | Bianchi | A01K 15/026 |
| 9,844,207 | B1 * | 12/2017 | Wright | A46B 3/00 |
| 11,503,806 | B1 * | 11/2022 | Mullin | A46B 11/0041 |
| 2004/0134446 | A1 | 7/2004 | Keller | |
| 2005/0166865 | A1 * | 8/2005 | Handelsman | A01K 15/026 119/709 |
| 2006/0134278 | A1 * | 6/2006 | Miller | A01K 15/026 426/132 |
| 2007/0068464 | A1 * | 3/2007 | Smith | A01K 15/025 119/709 |
| 2007/0261644 | A1 * | 11/2007 | Simon | A01K 15/025 119/707 |
| 2008/0178813 | A1 * | 7/2008 | Lescroart | A01K 5/0114 119/51.01 |
| 2009/0095231 | A1 * | 4/2009 | Axelrod | A01K 15/026 119/709 |
| 2012/0204809 | A1 * | 8/2012 | Axelrod | A01K 15/026 119/709 |
| 2012/0272922 | A1 * | 11/2012 | Axelrod | A01K 15/026 119/709 |
| 2013/0167780 | A1 | 7/2013 | Axelrod et al. | |

(Continued)

OTHER PUBLICATIONS

International Search Report and Written Opinion from corresponding PCT Appln. No. PCT/US2024/014721, dated Jun. 4, 2024.

*Primary Examiner* — Morgan T Jordan
(74) *Attorney, Agent, or Firm* — Grossman, Tucker, Perreault & Pfleger, PLLC

(57) ABSTRACT

A separable chew toy having an internal cavity, which may be used to store an attractant, accessible via an engageable/disengageable clutch mechanism.

18 Claims, 12 Drawing Sheets

(56) References Cited

U.S. PATENT DOCUMENTS

| | | | |
|---|---|---|---|
| 2015/0296747 A1* | 10/2015 | Kellogg | A01K 15/026 |
| | | | 119/709 |
| 2015/0342145 A1* | 12/2015 | Christianson | H04W 4/80 |
| | | | 119/51.01 |
| 2017/0020109 A1 | 1/2017 | Dewey et al. | |
| 2017/0064926 A1* | 3/2017 | Gutierrez | A01K 5/00 |
| 2021/0212290 A1* | 7/2021 | Stern | A01K 15/026 |
| 2022/0256808 A1 | 8/2022 | Axelrod et al. | |
| 2022/0323830 A1* | 10/2022 | Cleghorn | A63B 39/00 |
| 2023/0148566 A1* | 5/2023 | Ubel | A23K 20/142 |
| | | | 119/707 |
| 2023/0292712 A1* | 9/2023 | Wilhelm | A01K 15/025 |
| | | | 119/711 |

* cited by examiner

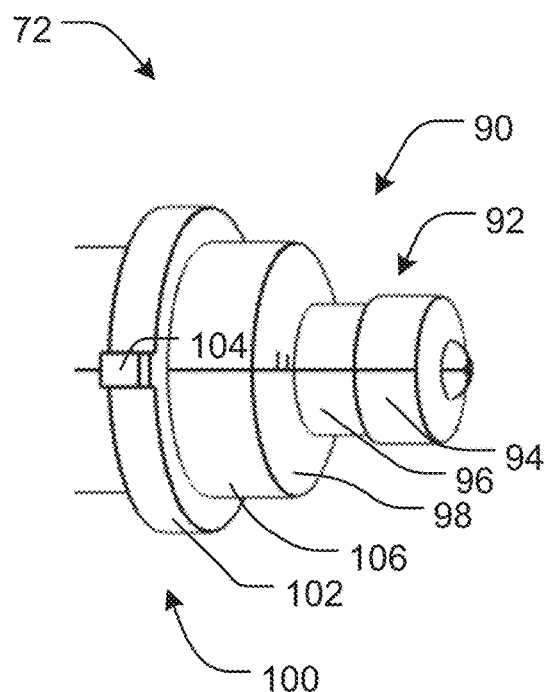
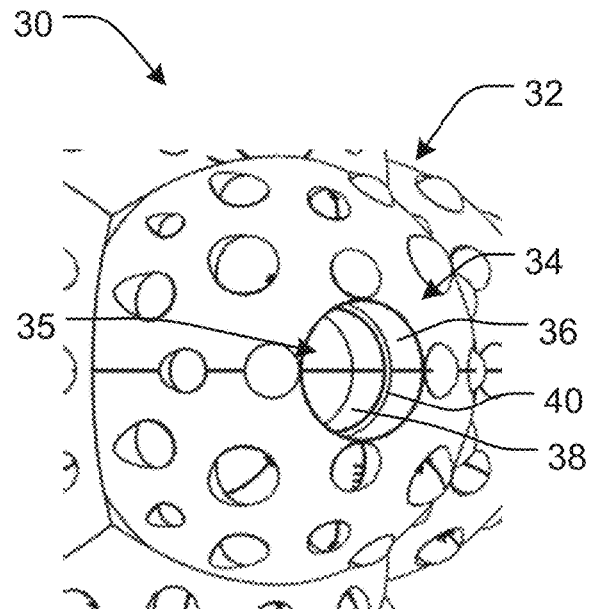
FIG. 8                    FIG. 9
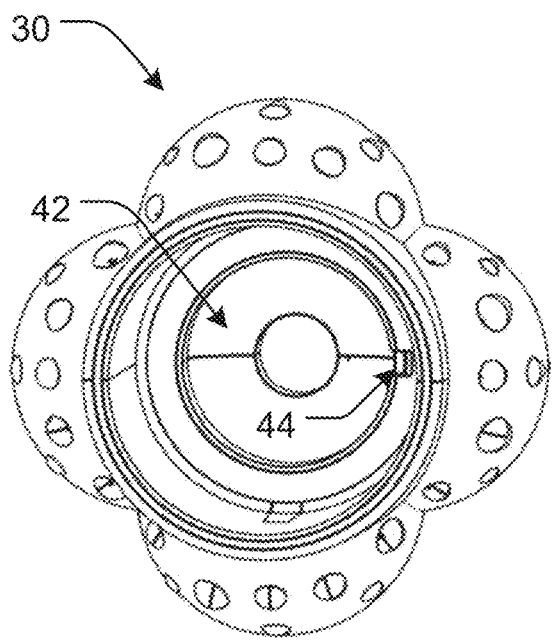
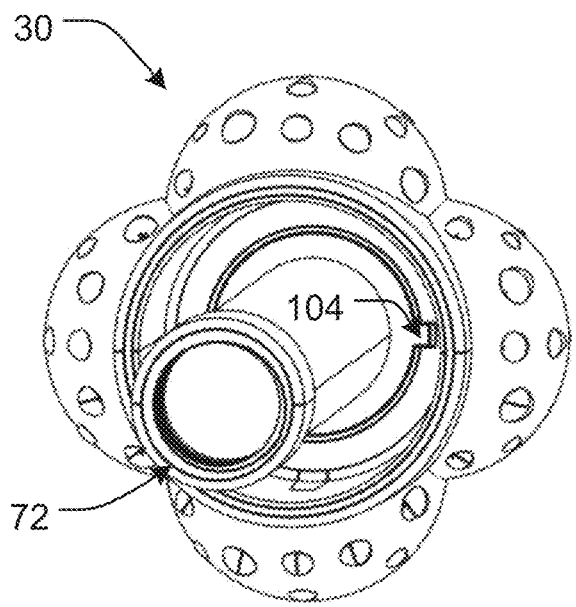
FIG. 10                   FIG. 11

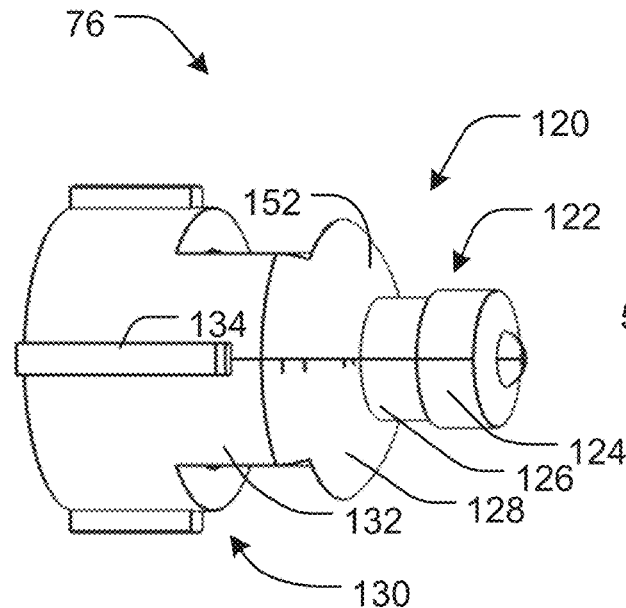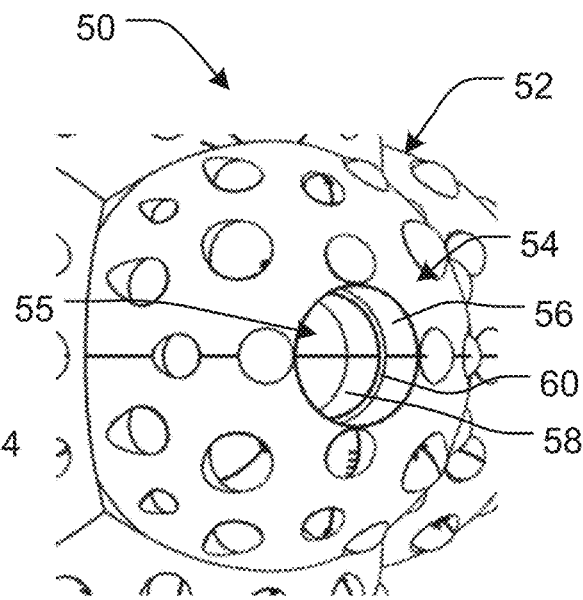
FIG. 12          FIG. 13
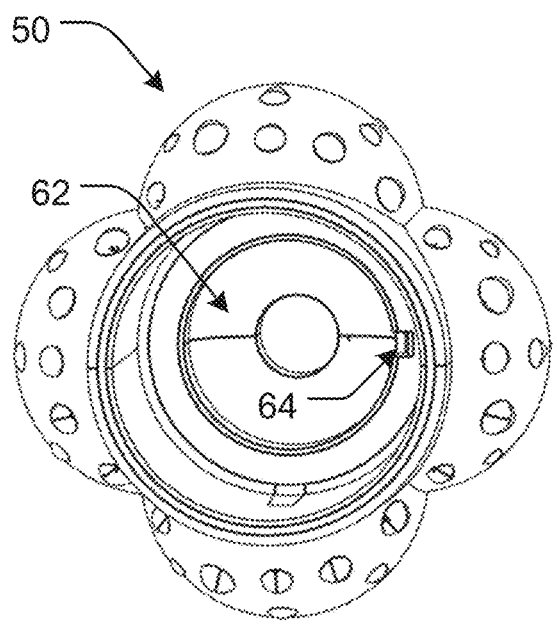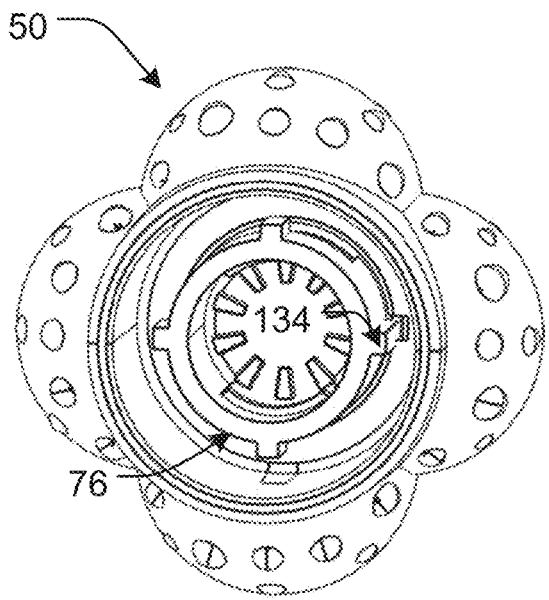
FIG. 14          FIG. 15

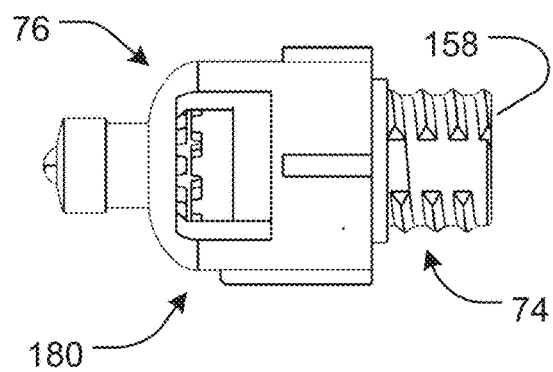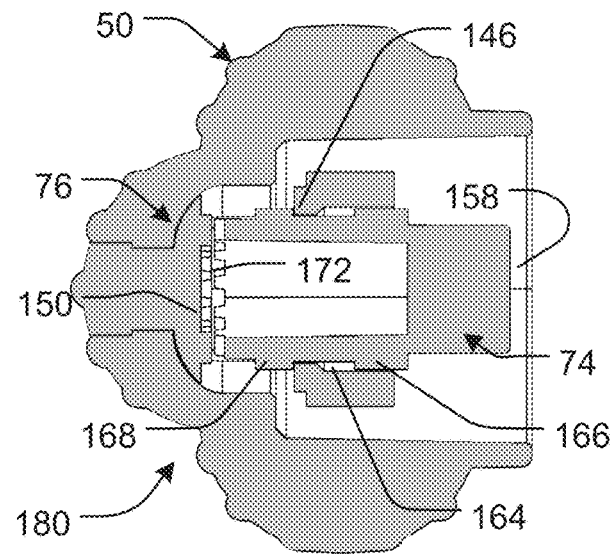
FIG. 19　　　　　　　FIG. 20
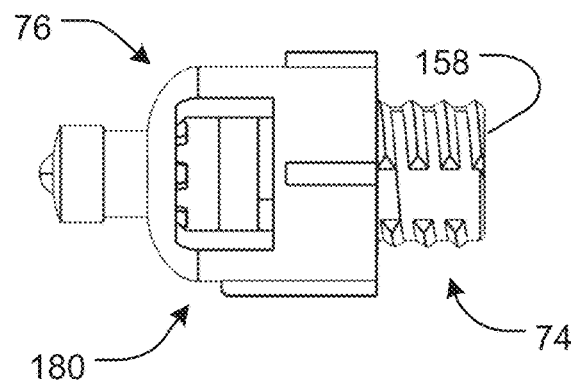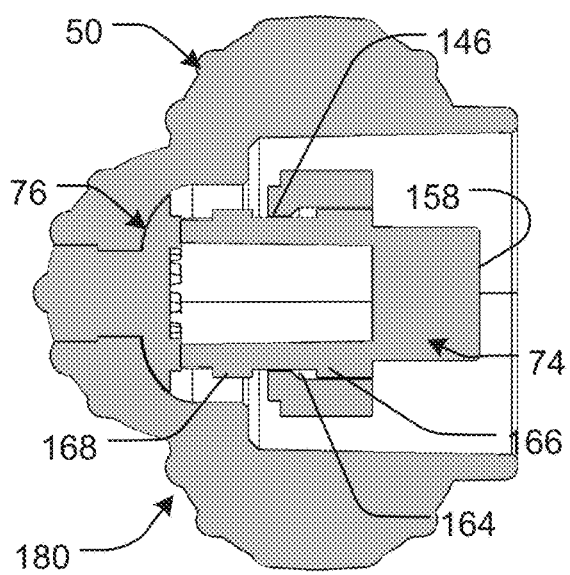
FIG. 21　　　　　　　FIG. 22

SEPARABLE CHEW TOY HAVING AN INTERNAL CAVITY ACCESSIBLE VIA A CLUTCH MECHANISM

FIELD

The present disclosure relates to a separable chew toy having an internal cavity, which may be used to store an attractant, accessible via an engageable/disengageable clutch mechanism.

BACKGROUND

Most dogs enjoy chewing on things, although preferences vary as to the hardness of the substances favored. Some dogs like to chew on very hard materials such as cow bones, wood and nylon, while others prefer softer chews such as polyurethane or rubber. Some dogs due to their age may not be able to chew on very hard substances. Young dogs may have insufficiently developed teeth, while old dogs may have diseased gums or may have lost some of their teeth.

Furthermore, chew toys may be used as a vehicle to provide interaction between dogs and people. For example, some people like to play fetch with chew toys. The interaction between animals and their owners has reportedly been found to be not only beneficial to the animal, as it provides the animal with necessary exercise and companionship, but beneficial to their owners as well, with many reported health related benefits.

Accordingly, the prior art is replete with disclosures directed at forming a variety of chew toys. However, there is still a need to provide chew toys that fulfill other requirements. In such regards, it may be useful to provide chew toys that enhance the attraction of the chew toy to the animal. For example, by providing the chew toy with an edible and/or scented attractant composition which attract the pet to the chew toy and increases the pet's interest in playing with the pet toy.

SUMMARY

A chew toy, as assembled, comprising a first end member and a second end member; an intermediate member having an intermediate member cavity accessible through a first end opening and/or a second end opening; a connecting rod which connects to the first end member and the second end member; wherein access to the intermediate member cavity through the first end opening is inhibited by the first end member and/or access to the intermediate cavity through the second end opening is inhibited by the second end member; wherein the connecting rod extends through the intermediate member cavity; wherein the connecting rod comprises at least two sections which are connected by a disconnectable mechanical connection providing positive mechanical engagement; wherein the connecting rod includes a clutch mechanism which is engageable and disengageable; wherein, when the clutch mechanism is disengaged, the first end member and the second end member are rotatable around the longitudinal axis without changing the positive mechanical engagement of the mechanical connection; and wherein, when the clutch mechanism is engaged, the disconnectable mechanical connection is disconnectable such that the first end member is movable away from the first end opening by which the intermediate member cavity is accessible through the first end opening and/or the second end member is movable away from the second end opening by which the intermediate member cavity is accessible through the second end opening.

In at least one embodiment, when the clutch mechanism is engaged, the positive mechanical engagement of the disconnectable mechanical connection is increasable by moving the first end member towards the second end member along the longitudinal axis and/or by moving the second end member towards the first end member along the longitudinal axis; and when the clutch mechanism is engaged, the positive mechanical engagement of the disconnectable mechanical connection is decreasable by moving the first end member away from the second end member along the longitudinal axis and/or by moving the second end member away from the first end member along the longitudinal axis.

In at least one embodiment, the first end member is movable towards the second end member along the longitudinal axis by rotation of the first end member in a first end member first rotation direction around the longitudinal axis and/or the second end member is movable towards the first end member by rotation of the second end member in a second end member first rotation direction around the longitudinal axis; and the first end member is movable away from the second end member along the longitudinal axis by rotation of the first end member in a first end member second rotation direction opposite the first end member first rotation direction around the longitudinal axis and/or the second end member is movable away from the first end member by rotation of the second end member in a second end member second rotation direction opposite the second end member first rotation direction around the longitudinal axis.

In at least one embodiment, the intermediate member cavity is accessible through the first end opening and the second end opening; access to the intermediate member cavity through the first end opening is inhibited by the first end member and access to the intermediate cavity through the second end opening is inhibited by the second end member; and when the clutch mechanism is engaged, the disconnectable mechanical connection is disconnectable such that the first end member is movable away from the first end opening by which the intermediate member cavity is accessible through the first end opening and/or the second end member is movable away from the second end opening by which the intermediate member cavity is accessible through the second end opening.

In at least one embodiment, the first end member has a first end member cavity; and the connecting rod extends within the first end member cavity.

In at least one embodiment, the intermediate member has a first end portion disposed in the first end member cavity.

In at least one embodiment, the second end member has a second end member cavity; and the connecting rod extends within the second end member cavity.

In at least one embodiment, the intermediate member has a second end portion disposed in the second end member cavity.

In at least one embodiment, the at least two sections of the connecting rod further comprise a connecting rod first section, a connecting rod second section, and a connecting rod intermediate section which mechanically connects to the connecting rod first section and the connecting rod second section.

In at least one embodiment, when the clutch mechanism is engaged, the connecting rod second section and the connecting rod intermediate section engage such that a rotation of the second end member and the connecting rod second section around the longitudinal axis in a first direction rotates the connecting rod intermediate section in the first direction, wherein rotation of the connecting rod intermediate section in the first direction mechanically connects the connecting rod intermediate section and the connecting rod first section; and when the clutch mechanism is engaged, the connecting rod second section and the connecting rod intermediate section engage such that a rotation of the second end member and the connecting rod second section around the longitudinal axis in a second direction oppose the first direction rotates the connecting rod intermediate section in the second direction, wherein rotation of the connecting rod intermediate section in the second direction mechanically disconnects the connecting rod intermediate section and the connecting rod first section;

In at least one embodiment, the connecting rod first section mechanically connects to the first end member and the connecting rod intermediate section; the connecting rod first section and the first end member are fixedly coupled to one another to rotate simultaneously around the longitudinal axis; the connecting rod second section mechanically connects to the second end member and the connecting rod intermediate section; and the connecting rod second section and the second end member are fixedly coupled to one another to rotate simultaneously around the longitudinal axis.

In at least one embodiment, the connecting rod first section and the connecting rod intermediate section are connected by the disconnectable mechanical connection; and the disconnectable mechanical connection comprises a threaded connection.

In at least one embodiment, the threaded connection comprises internally threaded connector and an externally threaded connector; the connecting rod first section comprises the internally threaded connector; and the connecting rod intermediate section comprises the externally threaded connector.

In at least one embodiment, the connecting rod intermediate section and the connecting rod second section form the clutch mechanism.

In at least one embodiment, the clutch mechanism has a clutch mechanism engaged position and a clutch mechanism disengaged position; the connecting rod intermediate section comprises a connecting rod intermediate section end face having a plurality of connecting rod intermediate section clutch teeth; the connecting rod second section comprises a connecting rod second section end face having a plurality of connecting rod second section clutch teeth; when the clutch mechanism is in the clutch mechanism engaged position, the plurality of connecting rod intermediate section clutch teeth and the plurality of connecting rod second section clutch teeth are engaged; and when the clutch mechanism is in the clutch mechanism disengaged position, the plurality of connecting rod intermediate section clutch teeth and the plurality of connecting rod second section clutch teeth are disengaged.

In at least one embodiment, the connecting rod intermediate section and the connecting rod second section are slidably movable relative to one another along the longitudinal axis between a clutch mechanism engaged position and a clutch mechanism disengaged position.

In at least one embodiment, the connecting rod intermediate section comprises an annular recess disposed between annular rings; the connecting rod second section comprises a cylindrical recess having at least one protrusion disposed on a face of the cylindrical recess; the annular recess and the annular rings of the connecting rod intermediate section are disposed in the cylindrical recess of the connecting rod second section, with the at least one protrusion disposed on the face of the cylindrical recess of the connecting rod second section disposed in the in the annular recess of the connecting rod intermediate section between the annular rings; and the at least one protrusion disposed on the face of the cylindrical recess of the connecting rod second section is slidably movable along the longitudinal axis in the annular recess of the connecting rod intermediate section between the annular rings.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 8 is a close-up three-dimensional view of a portion of a first end of a first section of a connecting rod of the chew toy of FIG. 1;

FIG. 9 is a close-up three-dimensional view of an outer portion of a first end member of the chew toy of FIG. 1;

FIG. 10 is an inner three-dimensional view of the first end member of the chew toy of FIG. 1;

FIG. 11 is an inner three-dimensional view of the first end member of the chew toy of FIG. 1 after mechanical connection of the first end of the first section of the connecting rod of the chew toy of FIG. 1;

FIG. 12 is a close-up three-dimensional view of a portion of a second end of second section of the connecting rod of the chew toy of FIG. 1;

FIG. 13 is a close-up three-dimensional view of an outer portion of a second end member of the chew toy of FIG. 1;

FIG. 14 is an inner three-dimensional view of the second end member of the chew toy of FIG. 1;

FIG. 15 is an inner three-dimensional view of the second end member of the chew toy of FIG. 1 after mechanical connection of the second end of the second section of the connecting rod of the chew toy of FIG. 1;

FIG. 19 is a side view of the second section of the connecting rod and the intermediate (coupler) section of the connecting rod of the chew toy of FIG. 1 without engagement of their respective engagement teeth;

FIG. 20 is a cross-sectional view of the second end member, the second section of the connecting rod and the intermediate (coupler) section of the connecting rod of the chew toy of FIG. 1 without engagement of their respective engagement teeth;

FIG. 21 is a side view of the second section of the connecting rod and the intermediate (coupler) section of the connecting rod of the chew toy of FIG. 1 with engagement of their respective engagement teeth;

FIG. 22 is a cross-sectional view of the second end member, the second section of the connecting rod and the intermediate (coupler) section of the connecting rod of the chew toy of FIG. 1 with engagement of their respective engagement teeth;

DETAILED DESCRIPTION

Figure 1:
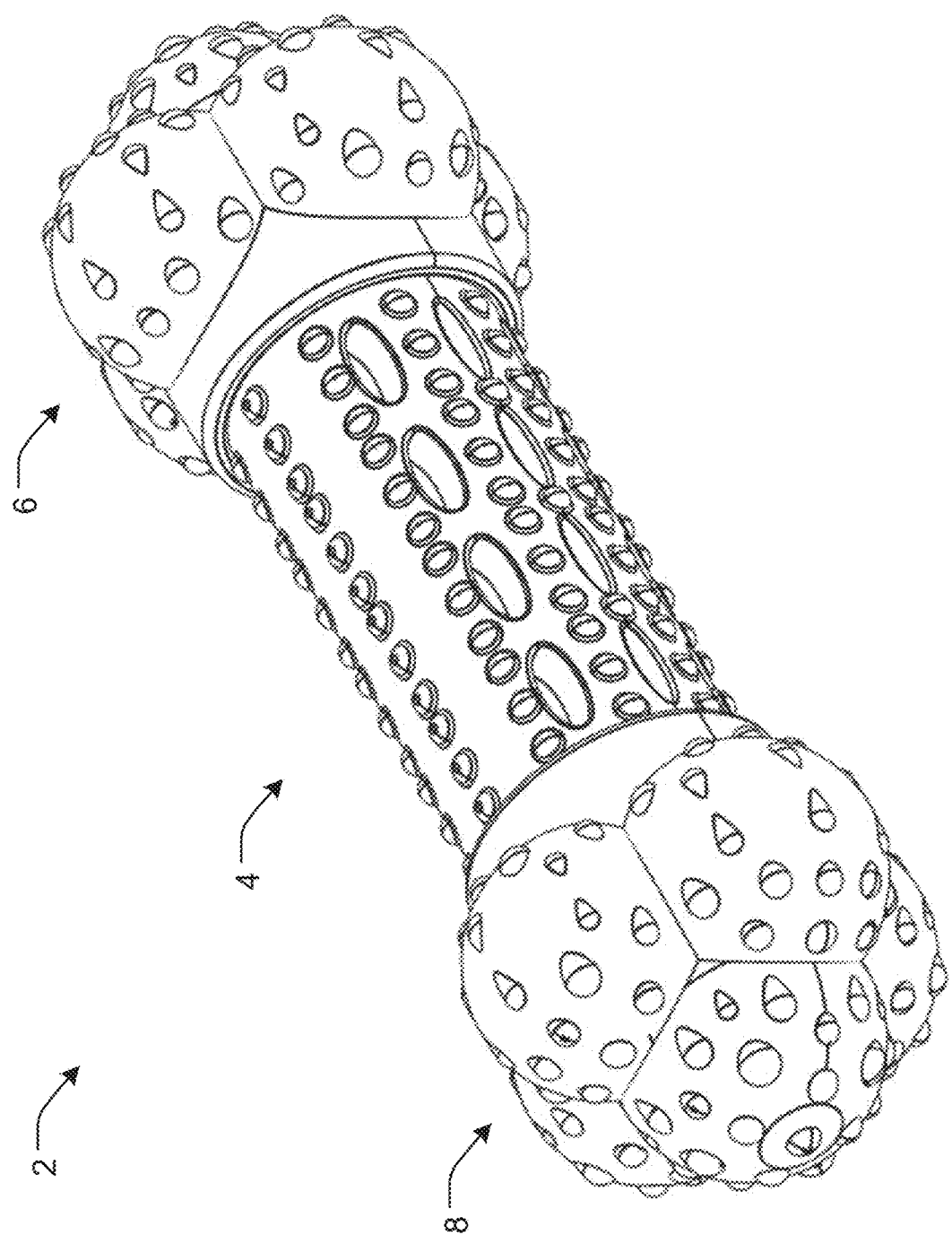
FIG. 1 is a three-dimensional view of a chew toy according to the present disclosure.
Figure 2:
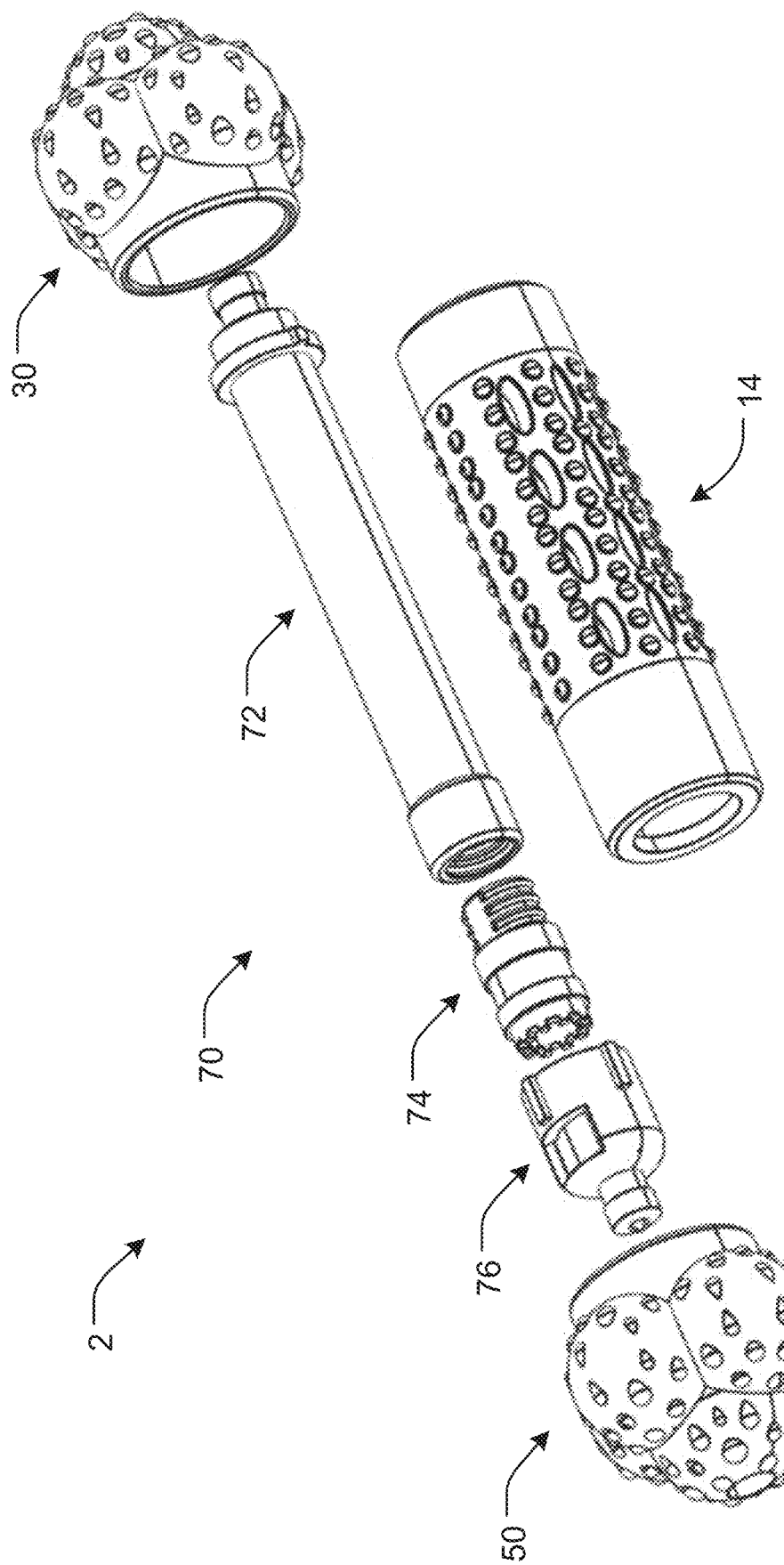
FIG. 2 is a fully exploded three-dimensional view of the chew toy of FIG. 1.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to FIGS. 1-24, there is shown a separable chew toy 2 with a mechanical clutch mechanism 180 (see e.g. FIGS. 20-23) for assembly and disassembly. As shown by FIG. 1, when assembled, the chew toy 2 is in a form of an elongated bone, particularly having an elongated intermediate (shaft) region 4 disposed between opposing bulbous (condyle) first and second ends 6, 8. The clutch mechanism 180 makes it difficult for a pet to inadvertently disassemble the chew toy 2.

As shown by FIGS. 2-7, the intermediate region 4 comprises an elongated, cylindrical, hollow, intermediate member 14, while ends 6, 8 comprises first and second end members 30, 50, respectively. All of the components may be formed of plastic composition, such as thermoplastic polymer composition.

As shown by the exploded views, a connecting rod 70, which is connected to end members 30, 50 when the chew toy 2 is assembled, extends through an enclosed, internal (storage) cavity 22 of the intermediate member 14 and into cavities 42, 62 of the end members 30, 50, respectively. As explained herein, cavity 22 may be used to store an attractant composition and thus may be an attractant holder container.

Connecting rod 70 comprises a first section 72, an intermediate (coupler) section 74 and a second section 76. As shown, the first section 72 connects with first end member 30, the second section 76 connects with second end member 50, and the intermediate section 74 connects with both the first section 72 and the second section 76.

With the connecting rod 70, the first end 6 of the chew toy 2 comprises end member 30 and first section 72 of the connecting rod 70, while second end 8 comprises end member 50, as well as intermediate section 54 and second section 76 of the connecting rod 70.

As shown by FIG. 8, the first section 72 of the connecting rod 70 has a first end member mating connector 90, which extends from shaft 100 along longitudinal axis L-L (see FIG. 3), which also may be referred to as the assembly/disassembly axis. Referring to FIG. 9, first end member mating connector 90 of the first section 72 of the connecting rod 70 mates with/mechanically connects to a first end member connector 32 of the first end member 30.

As shown by FIG. 8, first end member mating connector 90 comprises a male (stud) connector 92. Male connector 92 comprises a cylindrical head 94 and a cylindrical (undercut) neck 96, which is disposed between head 94 and shoulder 98.

As shown by FIG. 9, first end member connector 32 comprises a female (stud receptacle) connector 34, which comprises a through-hole 35 having a counter-bore 36. As shown, the through-hole 35 comprises a cylindrical counter-bore (diameter) 36 which is larger than the cylindrical bore (diameter) 38, which creates a ledge 40 therebetween.

To be assembled, at least one of the first end member mating connector 90 of the first section 72 of the connecting rod 70 and first end member connector 32 of the first end member 30 are moved towards one another along longitudinal axis L-L such that at least one of the first end member mating connector 90 and the first end member connector 34 clastically deform, by which the head 94 of the male connector 94 passes through bore 38 of the female connector 34, and then elastically recovers. As a result, the head 94 and the neck 96 of the male connector 92 are press-fit and disposed in the counter-bore 36 and bore 38 of the female connector 34, respectively. With the foregoing construction, after assembly, the first section 72 of the connecting rod 70 and first end member 30 are inhibited from separation/disassembly in both directions along the longitudinal axis L-L by a positive mechanical engagement. A positive mechanical engagement connection may be understood herein as a connection formed between separate components which does not rely solely on friction to inhibit separation of the components and which includes a mechanical interlock to inhibit separation of the components (e.g. overlapping surfaces).

As shown by FIG. 8, the first section 72 further comprises a protruding locking tab 104, which protrudes/extends radially (perpendicular) to the longitudinal axis L-L from a protruding ring 102 on the cylindrical shaft 100, which protrudes radially outward from the shaft 100/longitudinal axis L-L and extends circumferentially around the shaft 100.

As shown by FIG. 10, the cavity 42 of first end member 30 comprises a locking tab (recess) receptacle 44, which receives locking tab 104 upon assembly of the first section 72 and the first end member 30. As shown by FIG. 11, when the locking tab 104 is disposed in the tab receptacle 44, the first section 72 and the first end member 30 are fixedly coupled to co-rotate (rotate simultaneously together) around the longitudinal axis (L-L).

Figure 3:
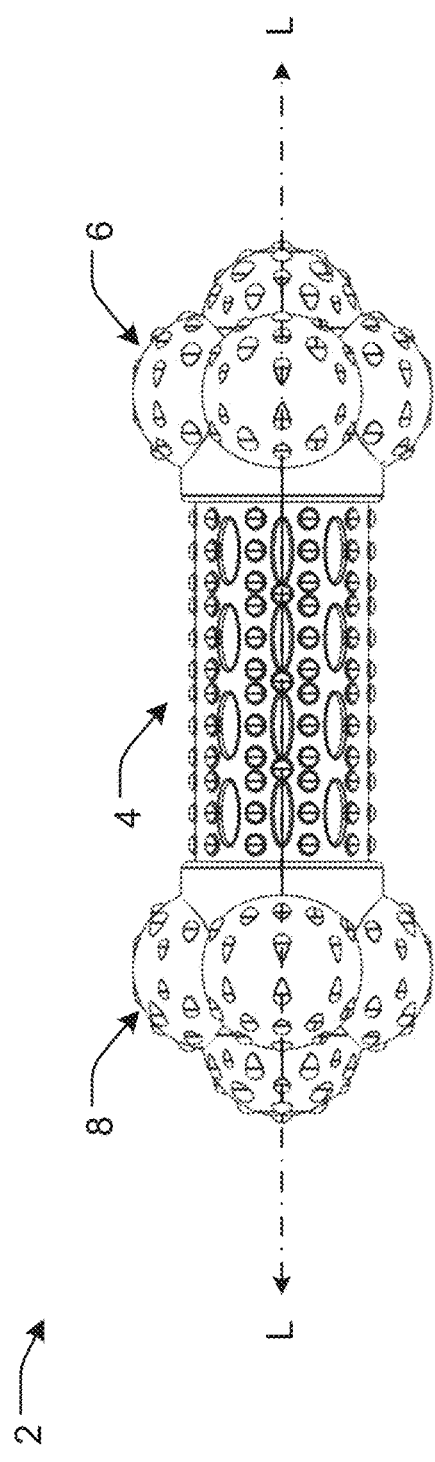
FIG. 3 is a side view of the chew toy of FIG. 1.
Figure 4:
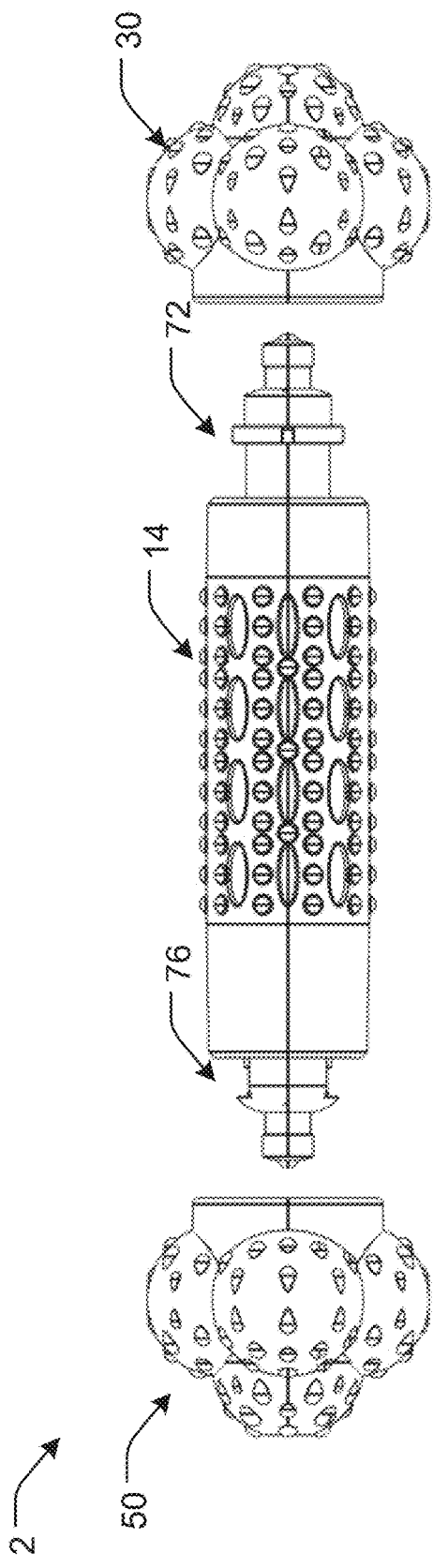
FIG. 4 is a partially exploded side view of the chew toy of FIG. 1.
Figure 5:
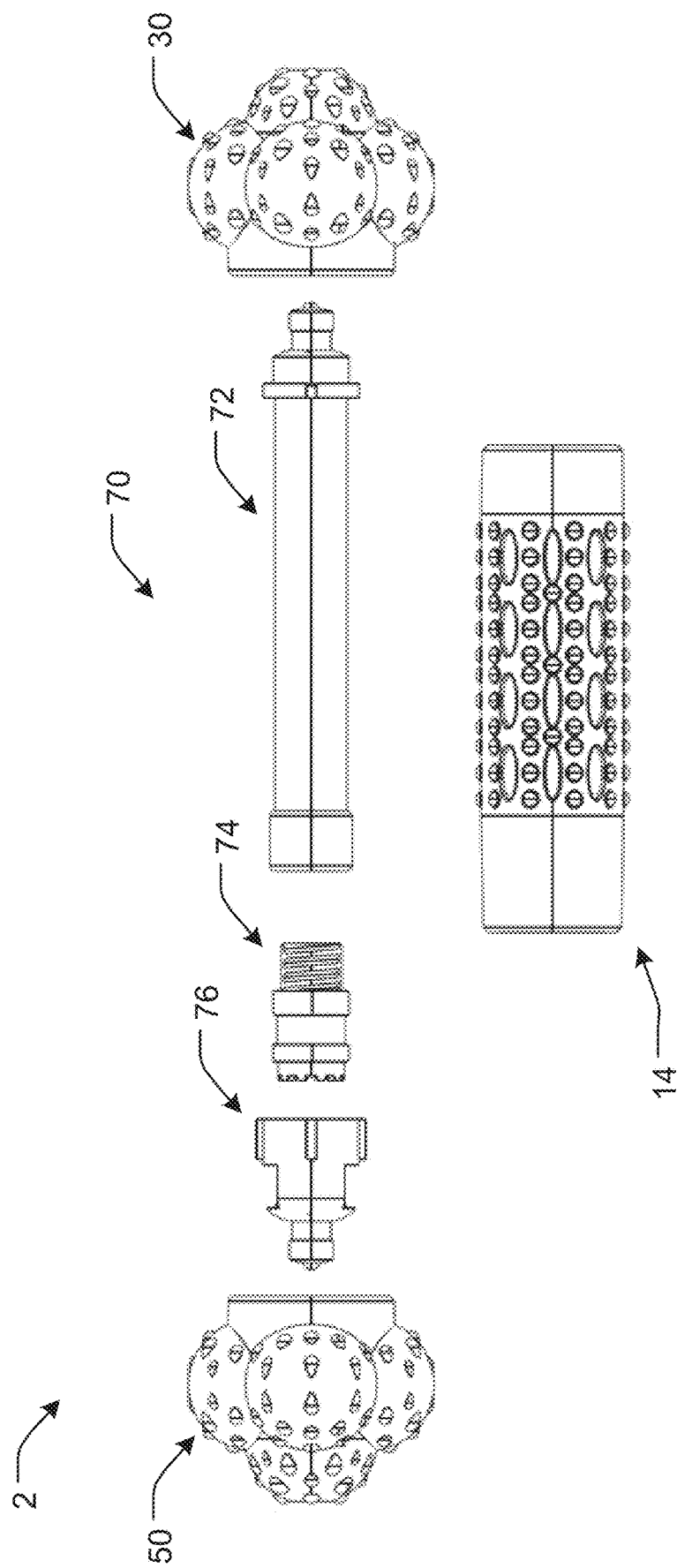
FIG. 5 is a fully exploded side view of the chew toy of FIG. 1.

Referring to FIG. 12, at the opposite end of chew toy 2, the second section 76 of connecting rod 70 has a second end member mating connector 120 which extends from shaft 130 along longitudinal axis L-L (see FIG. 3). Referring to FIG. 13, second end member mating connector 120 of the second section 76 of the connecting rod 70 mates with/mechanically connects to a second end member connector 52 of the second end member 50.

As shown by FIG. 12, second end member mating connector 120 comprises a male (stud) connector 122. Male connector 122 comprises a cylindrical head 124 and a cylindrical (undercut) neck 126, which is disposed between head 124 and shoulder 128 formed by end wall 152.

As shown by FIG. 13, second end member connector 52 comprises a female (stud receptacle) connector 54, which comprises through-hole 55 having a counter-bore 56. As shown, the through-hole 55 comprises a cylindrical counter-bore (diameter) 56 which is larger than the cylindrical bore (diameter) 58, which creates a ledge 60 therebetween.

To be assembled, at least one of the second end member mating connector 120 of the second section 76 of the connecting rod 70 and second end member connector 52 of the second end member 50 are moved towards one another along longitudinal axis L-L such that at least one of the second end member mating connector 120 and the second end member connector 52 elastically deform, by which the head 124 of the male connector 122 passes through bore 58 of the female connector 54, and then elastically recovers. As a result, the head 124 and the neck 126 of the male connector 122 are press-fit and disposed in the counter-bore 56 and bore 58 of the female connector 54, respectively. With the foregoing construction, after assembly, the second section 76 of the connecting rod 70 and second end member 50 are inhibited from separation/disassembly in both directions along the longitudinal axis L-L by a positive mechanical engagement.

As shown in FIG. 12, the second section 76 further comprises a protruding locking tab 134, which protrudes radially (perpendicular) to the longitudinal axis L-L from the cylindrical wall 132 of shaft 130.

As shown by FIG. 14, the cavity 62 of second end member 50 comprises a locking tab (recess) receptacle 64, which receives locking tab 134 upon assembly of the second section 76 and the second end member 50. As shown by FIG. 15, when the locking tab 134 is disposed in the tab receptacle 64, the second section 76 and the second end member 50 are fixedly coupled to co-rotate (rotate simultaneously together) around the longitudinal axis L-L.

Figure 16:
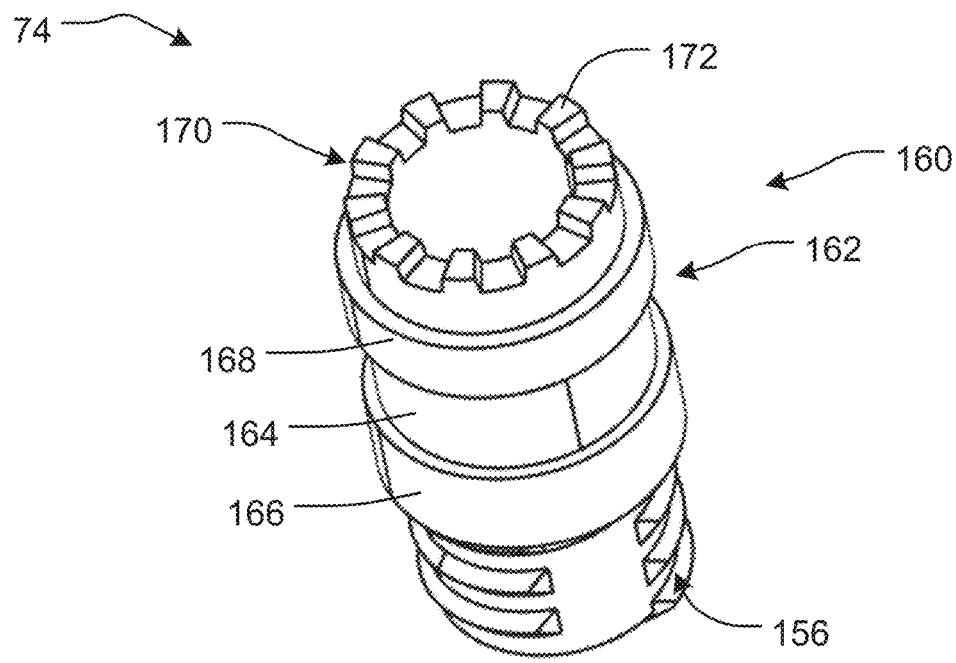
FIG. 16 is a three-dimensional view of the intermediate (coupler) section of the connecting rod of the chew toy of FIG. 1.

Turning to the intermediate section 74 of the connecting rod 70 as shown in FIG. 16, such may be also referred to as a shaft coupler, which mechanically couples to and with both the first section 72 and the second section 76 of the connecting rod 70.

Intermediate section 74 has a first mating connector 156, which releasably mechanically connects with a first connector 110 (see FIG. 6) of the first section 72. Unlike the other mechanical connections of pet toy 2, the mechanically connection between the first connector 110 of the first section 72 and the first mating connector 156 of the intermediate section 74 is configured/intended to be disconnectable (and reconnectable) during use of the chew toy 2, while the other mechanical connections are not configured/intended to be disconnectable without possible damage to the chew toy 2.

Figure 6:
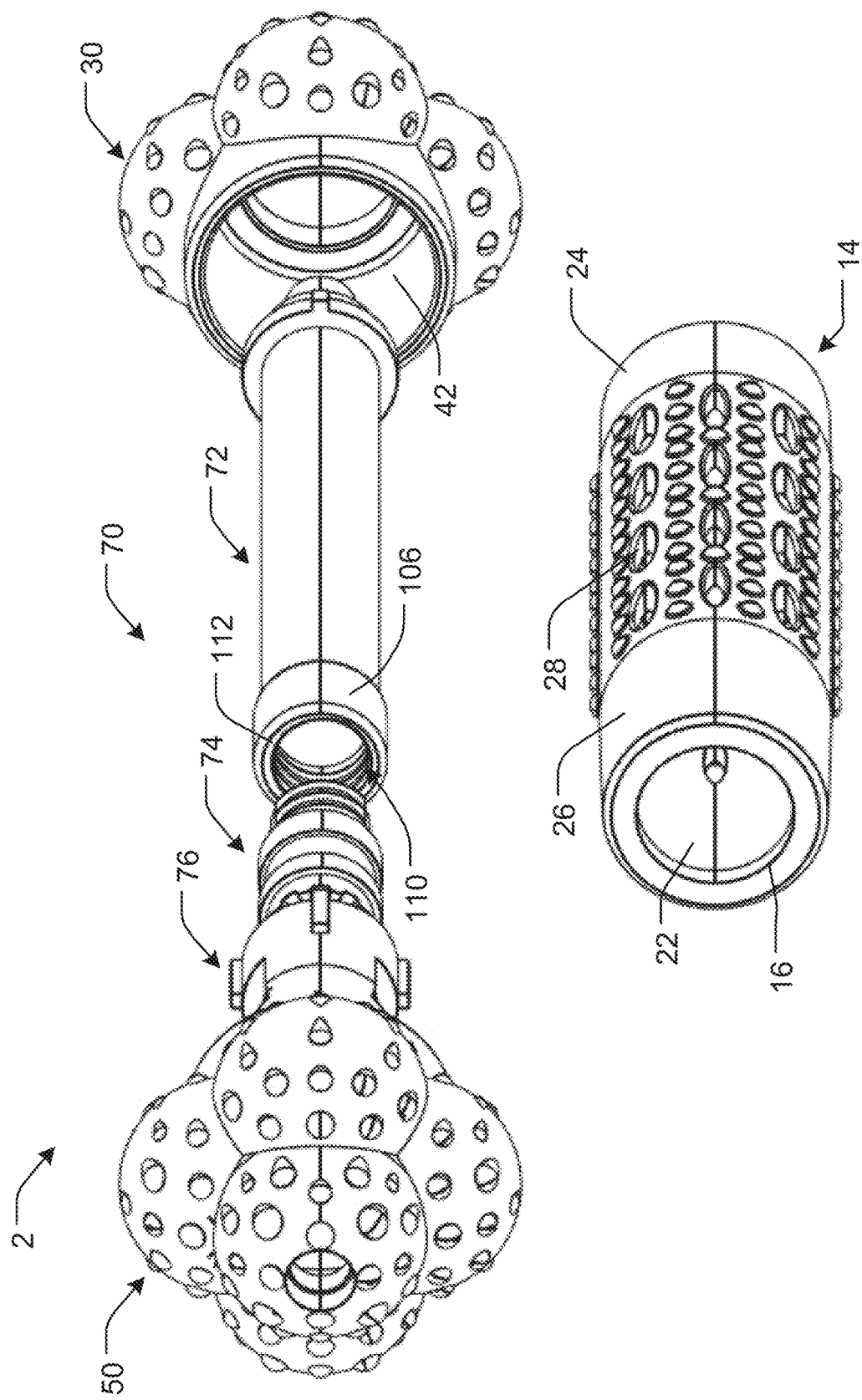
FIG. 6 is a fully exploded three-dimensional view of the chew toy of FIG. 1.
Figure 7:
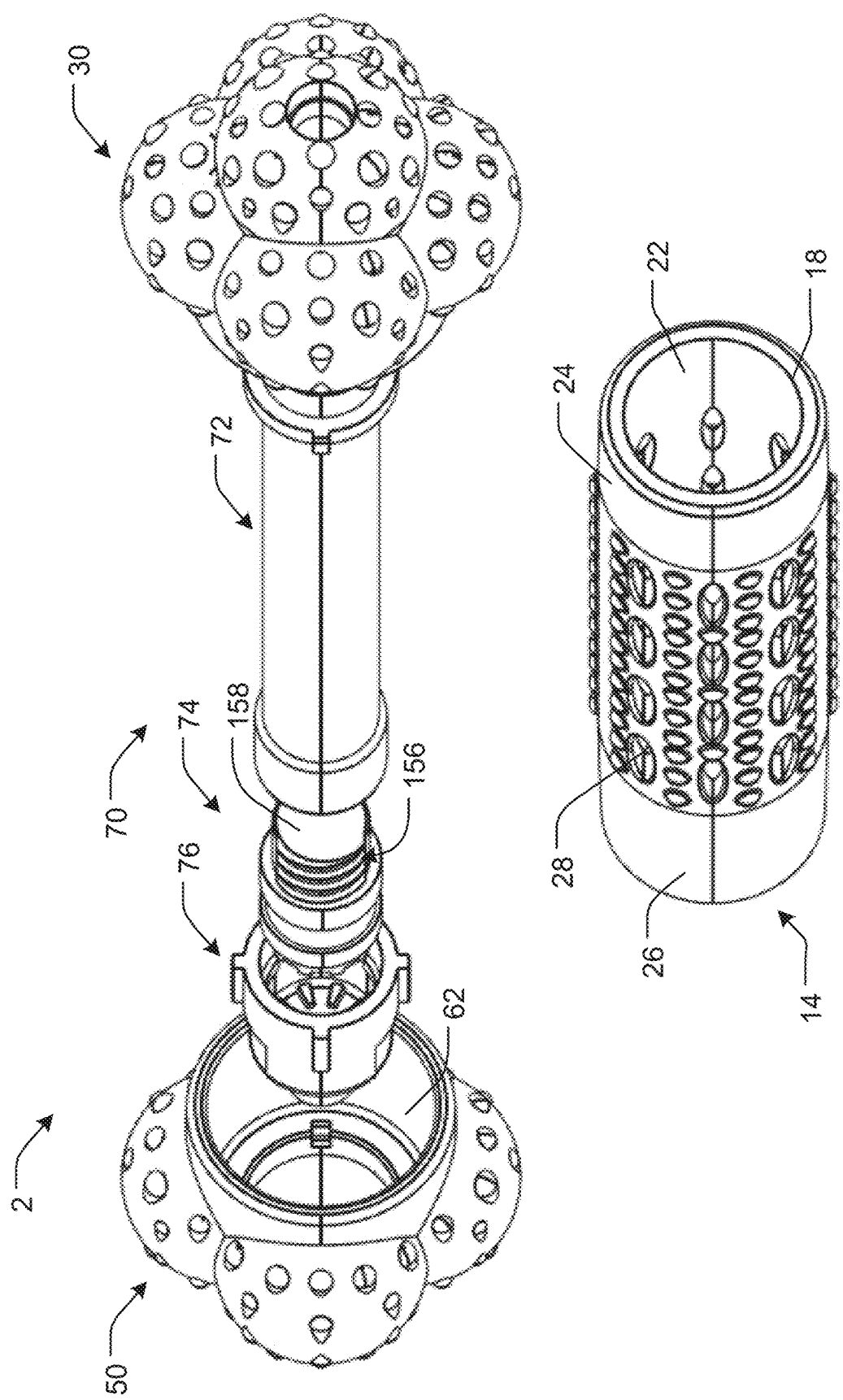
FIG. 7 is another fully exploded three-dimensional view of the chew toy of FIG. 1.

As shown by FIG. 16, the first mating connector 156 of intermediate section 74 comprises a male (threaded) connector, and more particularly an externally threaded cylindrical stud, while first connector 110 of the first section 72, as shown in FIG. 6, comprises a female (threaded receptacle) connector formed in the cylindrical wall 106 of shaft 100, and more particularly an internally threaded cylindrical recess.

After being aligned axially on the longitudinal axis L-L, the first mating connector 156 of the intermediate section 74 and the first connector 110 of the first section 72 are assembled by at least one of the intermediate section 74 and the first section 72 being rotated in a first direction (e.g. clockwise) around the longitudinal axis L-L into threaded connection such that the male threads are disposed in the female threads as at least one of the first end member (30) and the second end member (50) move towards one another along the longitudinal axis L-L. With the foregoing construction, after assembly, the intermediate section 74 and the first section 72 of the connecting rod 70 are inhibited from separation in both directions along the longitudinal axis L-L by a positive mechanical engagement. It should be understood that the positive mechanical engagement of the mechanical connection is increasable upon movement of at least one of the first end member 30 and the second end member 50 towards one another along the longitudinal axis L-L particularly due to the increasing engagement of the threaded connection.

The first mating connector 156 of the intermediate section 74 and the first connector 110 of the first section 72 are thereafter disconnectable by at least one of the intermediate section 74 and the first section 72 being rotated in a second direction opposite the first direction (e.g. counter-clockwise) around the longitudinal axis L-L out of threaded connection such that the male threads are no longer disposed in the female threads as at least one of the first end member (30) and the second end member (50) move away from one another along the longitudinal axis L-L. It should be understood that the positive mechanical engagement of the mechanical connection is decreasable upon movement of at least one of the first end member 30 and the second end member 50 away from one another along the longitudinal axis (L-L) particularly due to the decreasing engagement of the threaded connection.

Again referring to FIG. 16, intermediate section 74 also has a second mating connector 160, which mechanically connects with a second connector 140 of the second section 76. As shown, the second mating connector 160 of the intermediate section 74 comprises a cylindrical male connector 162. Male connector 162 comprises an annular cylindrical (undercut) recess 164 disposed between adjacent protruding annular rings 166, 168, which all extend circumferentially 360 degrees around the intermediate section 74.

Male connector 162 further comprises a circular end face 170, which includes a plurality of uniform engagement teeth 172 arranged circumferentially and equally spaced around a perimeter of the circular end face 170 and which protrude/extend axially along the longitudinal axis L-L towards the second section 76.

Figures 17, 18:
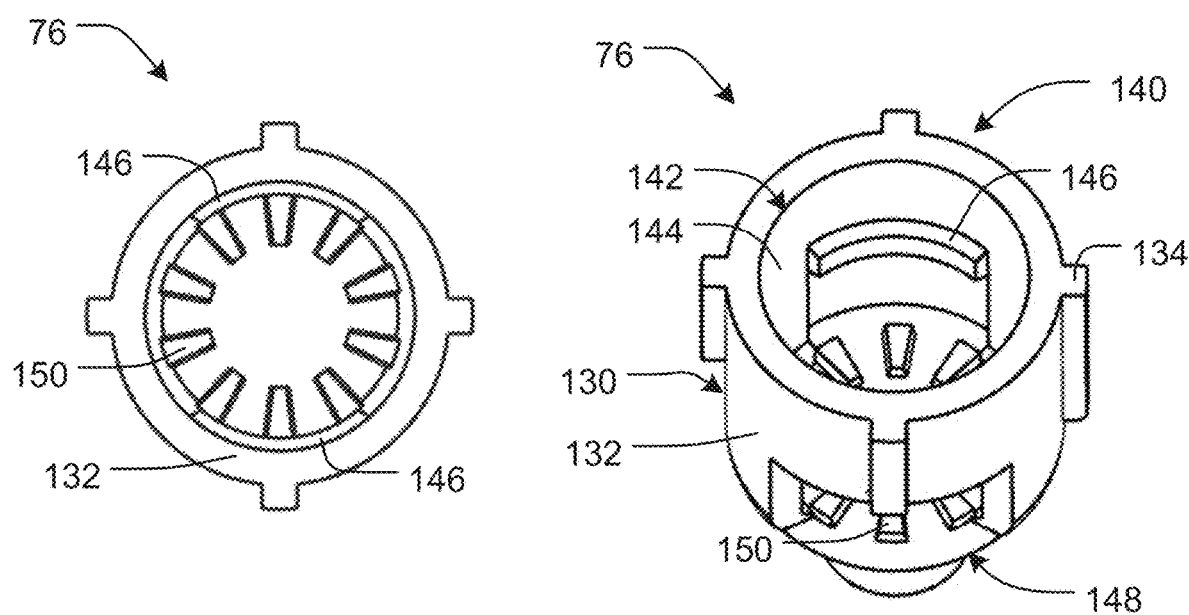
FIG. 17 is an inner end view of the second section of the connecting rod of the chew toy of FIG. 1.
FIG. 18 is a three-dimensional view of the second section of the connecting rod of the chew toy of FIG. 1.

Referring to FIGS. 17-18, second connector 140 of second section 76 comprises a female (receptacle) connector 142 formed in the shaft 130. As shown, female connector 142 comprises a cylindrical recess 144 formed by cylindrical wall 132 of shaft 130, with two inwardly protruding, circumferentially extending, elongated protrusions 146 arranged opposite (facing) one another on the inner face of the recess 144/wall 132. Female connector 142 further comprises a circular end face 148, which includes a plurality of uniform engagement teeth 150 arranged circumferentially and equally spaced around a perimeter of the circular end face 148 of end wall 152 and which protrude/extend axially along the longitudinal axis L-L towards the intermediate section 74.

To be assembled, at least one of the second connector 140 of the second section 76 and the second mating connector 160 of the intermediate section 74 are moved towards one another along longitudinal axis L-L such that at least one of the second connector 140 and the second mating connector 160 elastically deform, by which the protrusions 146 of the second connector 140 are disposed in the recess 164 of the second mating connector 160 between rings 166, 168, and then elastically recovers. Similar to the previously discussed mechanical connections, when assembled, the second section 76 and the intermediate section 74 are inhibited from separation in both directions along the longitudinal axis L-L by a positive mechanical engagement.

However, as may best be understood from FIGS. 20 and 22, in contrast to the other mechanical connections, when assembled, the second section 76 and the intermediate section 74 are slidably movable with translational movement along the longitudinal axis for a predetermined distance, which is part of clutch mechanism 180. As shown, the protrusions 146 of the second connector 140 have an axial dimensional distance along the longitudinal axis L-L which is less than the axial dimensional distance of the recess 160 of the second mating connector 160 between rings 166, 168, with the difference in the axial dimensional distance of the protrusions 146 versus the recess 150 providing the predetermined translational movement of the second section 76 and the intermediate section 74 relative to one another.

As best shown by FIGS. 19-22, as a result of the translational movement of at least one of the second section 76 and the intermediate section 74 towards one another (e.g. pushing together by hand) along the longitudinal axis L-L, the teeth 150, 172 of the clutch mechanism 180 (i.e. teeth 150 of the second section 76 and the teeth 172 of the intermediate section 74) are brought into a position of engagement to engage the clutch mechanism 180. Alternatively, once the teeth 150, 172. are engaged, the teeth 150, 172 may be brought into a position of disengagement, and corresponding disengagement of the clutch mechanism 180, by translational movement of at least one of the second section 76 and the intermediate section 74 away from one another (e.g. pulling apart by hand) long the longitudinal axis L-L.

Figure 23:
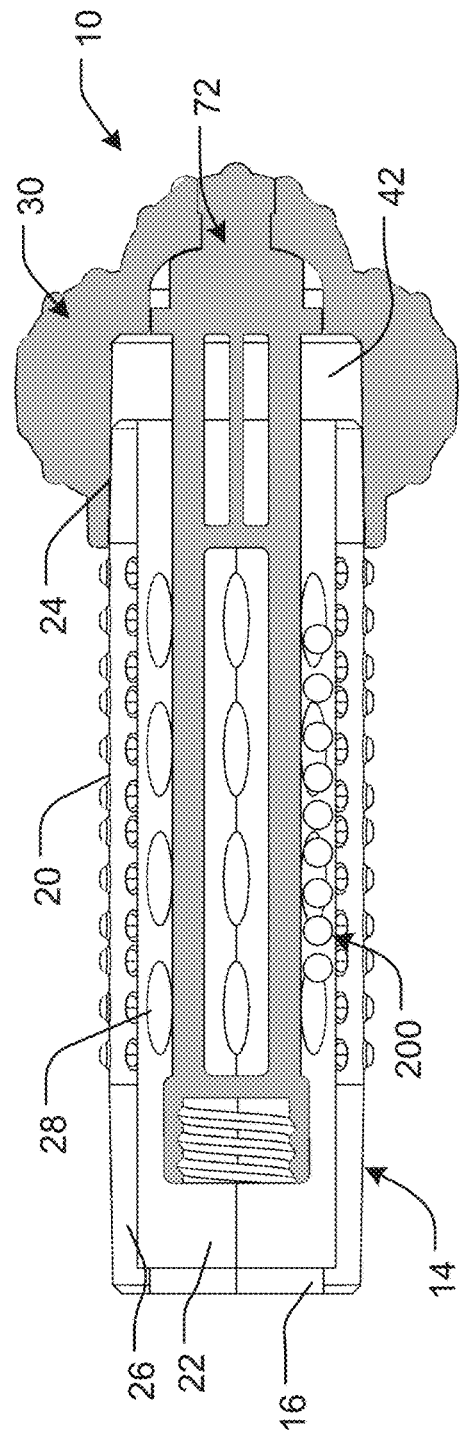
FIG. 23 is a cross-sectional view of the first end member and first section member of the connecting rod of the chew toy of FIG. 1.
Figure 24:
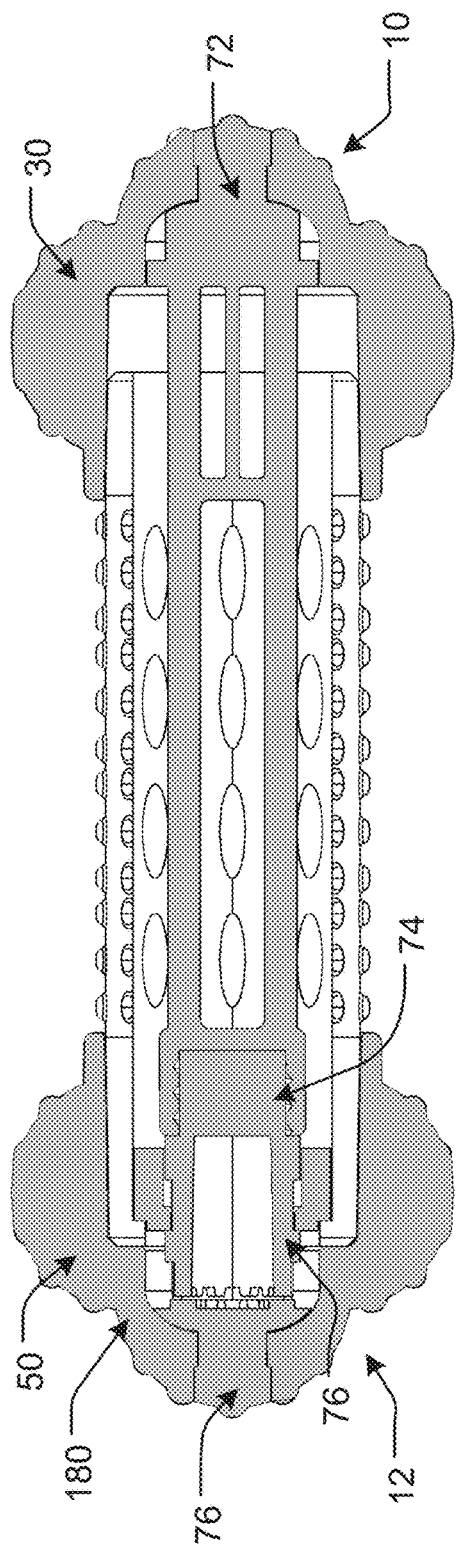
FIG. 24 is a cross-sectional view of the chew toy of FIG. 1.

Referring now to FIGS. 23-24, as may be understood from the foregoing description, to use of the pet toy 2, two subassemblies are first formed. The first subassembly 10 is formed of first end member 30 and first section 72 of the connecting rod 70, while the second subassembly 12 is formed of the second end member 50, second section 74 of the connecting rod 70 and the intermediate section 72 of the connecting rod 70. The subassemblies 10 and 12 as assembled as set forth prior.

Referring to FIG. 23, intermediate member 14 may then be joined with subassembly 10 by passing the first section 72 of the connecting rod 70 through end opening 18 and into cavity 22 of intermediate member 14. However, it should be understood that intermediate member 14 may alternatively be joined with subassembly 12 in similar fashion.

As shown, the first section 72 of the connecting rod 70 is then disposed within the cavity 22 of intermediate member 14, with a first cylindrical end portion 24 of intermediate member 14 disposed in and contacting with a cylindrical portion of cavity 42 of first end member 30, with the center axis of intermediate member 14 being coaxial with the longitudinal center axis L-L of connecting rod 70/chew toy 2.

Thereafter, if desirable, at least one attractant composition 200 may be added to the cavity 22 through the end opening 16, which may emit a scent which attracts the pet. The attractant composition 200 may comprise an edible attractant composition and/or scented attractant composition which attract the pet to the chew toy 2 and increases the pet's interest in playing with the pet toy 2. For example, a scent (e.g. bacon) may then permeate through through-holes 28 formed in the cylindrical wall 20 of intermediate member 14. The attractant composition 200 may in in the form of kibble having a size which is too big to exit through the through-holes 28, thus remaining trapped within the pet toy 2. The intermediate member 14 may be flexible (e.g. made of a polymer such as an elastomer), and thus flex and distort in response to being grasped/bitten by the pet, at which time the kibble may be at least partially broken into more smaller pieces within cavity 22 to a size small enough to exit through through-holes 28 to be consumed by the pet.

More particularly, the attractant composition 200 may be a scented composition, which may have a scent of a foodstuff (e.g. bacon), or simply a scent of an animal (e.g. pig, chicken, bison, horse). The attractant composition 200 and the scent may be provided by a portion of an animal anatomy, which may include cars (e.g. pig), feet (clawed feet (e.g. chicken), hooved feet (e.g. pig), webbed feet (e.g. duck)), penis/pizzle (e.g. bull), antler (e.g. deer, elk), rib, femur, knee, elbow or other bone (e.g. cow), and skin/hide (e.g. pig). In this embodiment the attractant composition 200 may be a rigid, breakable foodstuff composition (e.g. kibble or other hard (dry) food).

Thereafter, the end face 112 (see FIG. 6) of the first connector 110 of first section 72 of the connecting rod 70 is axially aligned with the end face 158 (see FIGS. 7 and 19-22) of the first mating connector 156 of intermediate section 74 of the connecting rod 70. Once aligned, at least one the first section 72 and the intermediate section 74 is moved axially towards one another such that second cylindrical end portion 26 of intermediate member 74 is disposed in and contacts with cylindrical portion of cavity 62 of second end member 50, which closes the cavity 22 of the intermediate member 74.

Upon further axial movement of at least one the first section 72 and the intermediate section 74 towards one another, that end face 112 of first section 72 and end face 158 of intermediate section 74 come into contact with one another. Thereafter, after contact of end faces 112, 158 of the first section 72 and intermediate section 74 of the connecting rod 70, the second section 76/second end member 50 then continue to move axially towards first section 72/first end member 30 such that the teeth 150, 172 of the second section 76 and the intermediate section 172 mesh and come into engagement. After meshing engagement of the teeth 150, 172, at least one of the first subassembly 10/first end member 30 and the second subassembly 12/second end member 50 is rotated in a first direction around the longitudinal axis L-L such that the first (female threaded) connector 110 of the first section 72 threadedly connects with the first (male threaded) mating connector 156 of the intermediate section 74. Upon being suitably threadedly connected, the axial (pushing) force keeping the teeth 150, 172 axially engaged may be eliminated such that the teeth 150, 172 disengage. As a result, when the clutch mechanism 180 is disengaged, and the releasable mechanical connection is connected, the first end member 30 and the second end member 50 are rotatable around the longitudinal axis L-L indefinitely without the releasable mechanical connection disconnecting.

Thereafter, the first (female threaded) connector 110 of the first section 72 may be threadedly disconnected from the first (male threaded) mating connector 156 of the intermediate section 74 by once again applying an axial force to the intermediate section 74 and second section 76 such that the teeth 150, 172 of the second section 76 and the intermediate section 172 mesh and come into engagement. After meshing engagement of the teeth 150, 172, at least one of the first subassembly 10/first end member 30 and the second subassembly 12/second end member 50 is rotated in a second direction opposite the first direction around the longitudinal axis L-L such that the first (female threaded) connector 110 of the first section 72 thread ably disconnects with the first (male threaded) mating connector 156 of the intermediate section 74. When the releasable mechanical connection is disconnected, at least one of the first subassembly 10/first end member 30 and the second subassembly 12/second end member 50 is separable from a remainder of the chew toy 2 such that the intermediate member cavity 22 is accessible through at least one of the first end opening 16 and the second end opening 18. The cavity 22 may then be filled with attractant composition 200, or the attractant composition 200 already therein may be added to or replaced.

Figure 25:
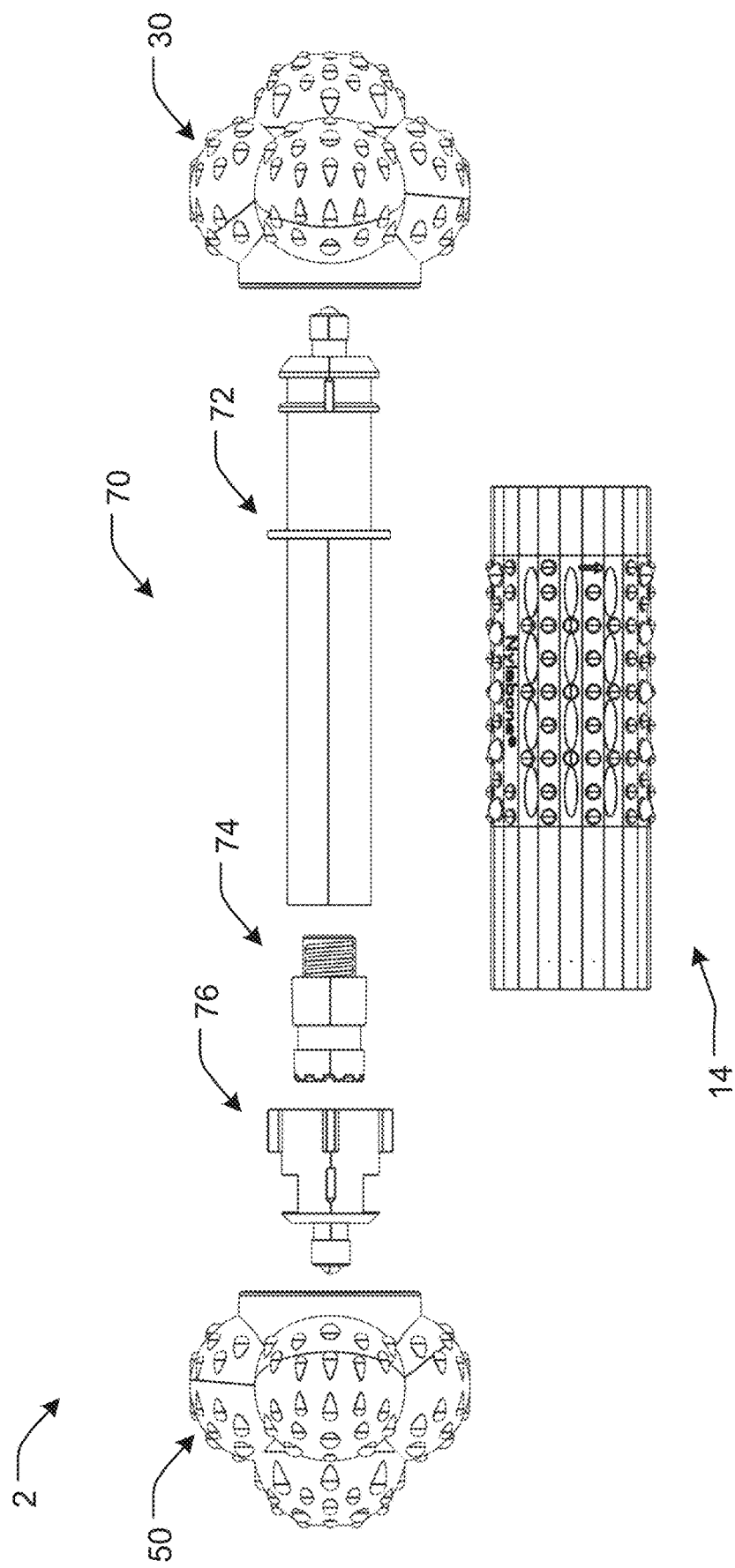
FIG. 25 is a fully exploded side view of an alternative chew toy.

Referring to FIG. 25, there is shown an alternative embodiment of a separable chew toy 2 with a mechanical clutch mechanism 180 for assembly and disassembly.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LISTING OF REFERENCE CHARACTERS 2 chew toy
4 intermediate region of chew toy
6 first end of chew toy
8 second end of chew toy
10 first subassembly
12 second subassembly
14 intermediate member
16 end opening
18 end opening
20 cylindrical wall
22 cavity of intermediate member
24 cylindrical end portion
26 cylindrical end portion
28 through-holes
30 first end member
32 first end member connector of first end member
34 female connector of first end member
35 through-hole of first end member
36 counter-bore of through-hole
38 bore of through-hole
40 ledge of counter-bore
42 cavity of first end member
44 locking tab receptacle of cavity
50 second end member
52 second end member connector of second end member
54 female connector of second end member
55 through-hole of second end member
56 counter-bore of through-hole
58 bore of through-hole
60 ledge of counter-bore
62 cavity of second end member
64 locking tab receptacle of cavity
70 connecting rod
72 first section of connecting rod
74 intermediate section of connecting rod
76 second section of connecting rod
90 first end member mating connector of first segment
92 male connector of first segment
94 head of male connector
96 neck of male connector
98 shoulder of male connector
100 shaft of first section of connecting rod
102 ring of shaft
104 tab of shaft
106 wall of shaft
110 first connector of first segment
112 end face
120 second end member mating connector of second segment
122 male connector of second segment
124 head of male connector
126 neck of male connector
128 shoulder of male connector
130 shaft of second section of connecting rod
132 wall of shaft
134 tab of shaft
140 second connector of second segment
142 female connector of second segment
144 recess
146 protrusion
148 end face
150 teeth
152 end wall
156 first mating connector of intermediate segment
158 end face
160 second mating connector of intermediate segment
162 male connector of intermediate segment
164 recess
166 ring
168 ring
170 end face
172 teeth
180 clutch mechanism
200 attractant composition
L-L longitudinal axis

What is claimed is:

1. A chew toy, as assembled, comprising:
a first end member and a second end member;
an intermediate member having an intermediate member cavity accessible through a first end opening and/or a second end opening;
a connecting rod which connects to the first end member and the second end member;
wherein access to the intermediate member cavity through the first end opening is inhibited by the first end member and/or access to the intermediate cavity through the second end opening is inhibited by the second end member;
wherein the connecting rod extends through the intermediate member cavity;
wherein the connecting rod comprises at least two sections which are connected by a disconnectable mechanical connection providing positive mechanical engagement;
wherein the connecting rod includes a clutch mechanism which is engageable and disengageable;
wherein, when the clutch mechanism is disengaged, the first end member and the second end member are rotatable around the longitudinal axis without changing the positive mechanical engagement of the mechanical connection; and
wherein, when the clutch mechanism is engaged, the disconnectable mechanical connection is disconnectable such that the first end member is movable away from the first end opening by which the intermediate member cavity is accessible through the first end opening and/or the second end member is movable away from the second end opening by which the intermediate member cavity is accessible through the second end opening.

2. The chew toy of claim 1, wherein:
when the clutch mechanism is engaged, the positive mechanical engagement of the disconnectable mechanical connection is increasable by moving the first end member towards the second end member along the longitudinal axis and/or by moving the second end member towards the first end member along the longitudinal axis; and
when the clutch mechanism is engaged, the positive mechanical engagement of the disconnectable mechanical connection is decreasable by moving the first end member away from the second end member along the longitudinal axis and/or by moving the second end member away from the first end member along the longitudinal axis.

3. The chew toy of claim 2, wherein:
the first end member is movable towards the second end member along the longitudinal axis by rotation of the first end member in a first end member first rotation direction around the longitudinal axis and/or the second end member is movable towards the first end member by rotation of the second end member in a second end member first rotation direction around the longitudinal axis; and
the first end member is movable away from the second end member along the longitudinal axis by rotation of the first end member in a first end member second rotation direction opposite the first end member first rotation direction around the longitudinal axis and/or the second end member is movable away from the first end member by rotation of the second end member in a second end member second rotation direction opposite the second end member first rotation direction around the longitudinal axis.

4. The chew toy of claim 1, wherein:
the intermediate member cavity is accessible through the first end opening and the second end opening;
access to the intermediate member cavity through the first end opening is inhibited by the first end member and access to the intermediate cavity through the second end opening is inhibited by the second end member; and
when the clutch mechanism is engaged, the disconnectable mechanical connection is disconnectable such that the first end member is movable away from the first end opening by which the intermediate member cavity is accessible through the first end opening and/or the second end member is movable away from the second end opening by which the intermediate member cavity is accessible through the second end opening.

5. The chew toy of claim 1, wherein:
the first end member has a first end member cavity; and
the connecting rod extends within the first end member cavity.

6. The chew toy of claim 5, wherein:
the intermediate member has a first end portion disposed in the first end member cavity.

7. The chew toy of claim 1, wherein:
the second end member has a second end member cavity; and
the connecting rod extends within the second end member cavity.

8. The chew toy of claim 7, wherein:
the intermediate member has a second end portion disposed in the second end member cavity.

9. The chew toy of claim 1, wherein:
the at least two sections of the connecting rod further comprise a connecting rod first section, a connecting rod second section, and a connecting rod intermediate section which mechanically connects to the connecting rod first section and the connecting rod second section.

10. The chew toy of claim 9, wherein:
when the clutch mechanism is engaged, the connecting rod second section and the connecting rod intermediate section engage such that a rotation of the second end member and the connecting rod second section around the longitudinal axis in a first direction rotates the connecting rod intermediate section in the first direction, wherein rotation of the connecting rod intermediate section in the first direction mechanically connects the connecting rod intermediate section and the connecting rod first section; and
when the clutch mechanism is engaged, the connecting rod second section and the connecting rod intermediate section engage such that a rotation of the second end member and the connecting rod second section around the longitudinal axis in a second direction oppose the first direction rotates the connecting rod intermediate section in the second direction, wherein rotation of the connecting rod intermediate section in the second direction mechanically disconnects the connecting rod intermediate section and the connecting rod first section.

11. The chew toy of claim 9, wherein:
the connecting rod first section mechanically connects to the first end member and the connecting rod intermediate section;
the connecting rod first section and the first end member are fixedly coupled to one another to rotate simultaneously around the longitudinal axis;
the connecting rod second section mechanically connects to the second end member and the connecting rod intermediate section; and
the connecting rod second section and the second end member are fixedly coupled to one another to rotate simultaneously around the longitudinal axis.

12. The chew toy of claim 11, wherein:
the connecting rod first section and the connecting rod intermediate section are connected by the disconnectable mechanical connection; and
the disconnectable mechanical connection comprises a threaded connection.

13. The chew toy of claim 12, wherein:
the threaded connection comprises internally threaded connector and an externally threaded connector;
the connecting rod first section comprises the internally threaded connector; and
the connecting rod intermediate section comprises the externally threaded connector.

14. The chew toy of claim 9, wherein:
the connecting rod intermediate section and the connecting rod second section form the clutch mechanism.

15. The chew toy of claim 14, wherein:
the clutch mechanism has a clutch mechanism engaged position and a clutch mechanism disengaged position;

the connecting rod intermediate section comprises a connecting rod intermediate section end face having a plurality of connecting rod intermediate section clutch teeth;

the connecting rod second section comprises a connecting rod second section end face having a plurality of connecting rod second section clutch teeth;

when the clutch mechanism is in the clutch mechanism engaged position, the plurality of connecting rod intermediate section clutch teeth and the plurality of connecting rod second section clutch teeth are engaged; and when the clutch mechanism is in the clutch mechanism disengaged position, the plurality of connecting rod intermediate section clutch teeth and the plurality of connecting rod second section clutch teeth are disengaged.

16. The chew toy of claim 14, wherein:

the connecting rod intermediate section and the connecting rod second section are slidably movable relative to one another along the longitudinal axis between a clutch mechanism engaged position and a clutch mechanism disengaged position.

17. The chew toy of claim 16, wherein:

the connecting rod intermediate section comprises an annular recess disposed between annular rings;

the connecting rod second section comprises a cylindrical recess having at least one protrusion disposed on a face of the cylindrical recess;

the annular recess and the annular rings of the connecting rod intermediate section are disposed in the cylindrical recess of the connecting rod second section, with the at least one protrusion disposed on the face of the cylindrical recess of the connecting rod second section disposed in the in the annular recess of the connecting rod intermediate section between the annular rings; and the at least one protrusion disposed on the face of the cylindrical recess of the connecting rod second section is slidably movable along the longitudinal axis in the annular recess of the connecting rod intermediate section between the annular rings.

18. The chew toy of claim 17, wherein:

the clutch mechanism has a clutch mechanism engaged position and a clutch mechanism disengaged position;

the connecting rod intermediate section comprises a connecting rod intermediate section end face having a plurality of connecting rod intermediate section clutch teeth;

the connecting rod second section comprises a connecting rod second section end face having a plurality of connecting rod second section clutch teeth;

when the clutch mechanism is in the clutch mechanism engaged position, the plurality of connecting rod intermediate section clutch teeth and the plurality of connecting rod second section clutch teeth are engaged; and when the clutch mechanism is in the clutch mechanism disengaged position, the plurality of connecting rod intermediate section clutch teeth and the plurality of connecting rod second section clutch teeth are disengaged.

* * * * *